(12) United States Patent
Kittaka

(10) Patent No.: US 9,471,261 B2
(45) Date of Patent: Oct. 18, 2016

(54) IMAGE PROCESSING APPARATUS, DISPLAY CONTROL METHOD, AND RECORDING MEDIUM

(71) Applicant: Fumiyoshi Kittaka, Kanagawa (JP)

(72) Inventor: Fumiyoshi Kittaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/742,928

(22) Filed: Jun. 18, 2015

(65) Prior Publication Data

US 2015/0286445 A1 Oct. 8, 2015

Related U.S. Application Data

(63) Continuation of application No. 14/182,366, filed on Feb. 18, 2014, now Pat. No. 9,094,559, which is a continuation of application No. 13/534,157, filed on Jun. 27, 2012, now Pat. No. 8,681,351.

(30) Foreign Application Priority Data

Jul. 26, 2011 (JP) ................................. 2011-163350

(51) Int. Cl.
*G06F 3/12* (2006.01)
*G06K 15/00* (2006.01)
(Continued)

(52) U.S. Cl.
CPC ......... *G06F 3/1204* (2013.01); *G06F 3/04817* (2013.01); *G06F 3/1257* (2013.01);
(Continued)

(58) Field of Classification Search
CPC .................................................. G06F 9/4443
USPC ....... 358/1.9, 1.13, 1.14; 715/700, 744, 835, 715/847
See application file for complete search history.

(56) References Cited

U.S. PATENT DOCUMENTS 5,706,411 A * 1/1998 McCormick ........... G06K 15/00 358/1.14
2001/0048823 A1 12/2001 Nomura et al.
(Continued)

FOREIGN PATENT DOCUMENTS

| JP | 2001-334735 | 12/2001 |
| JP | 2002-055860 | 2/2002 |

(Continued)

OTHER PUBLICATIONS

Japanese Office Action dated Apr. 21, 2015.
(Continued)

*Primary Examiner* — Thomas Lett
(74) *Attorney, Agent, or Firm* — IPUSA, PLLC

(57) ABSTRACT

An image processing apparatus includes a screen information storage part to store, on a user basis, the screen information of an operating screen containing a shortcut for calling an application; a shortcut creating part to, in response to receiving a request for a job of the application, create a job shortcut for executing the job based on the information of the requested job, and make a request for updating the screen information of a user having requested the job; a screen management part to, in response to receiving the screen information updating request, add information of the created job shortcut to the screen information of the user; a user management part to authenticate and manage the user; a screen creating part to create the operating screen containing the job shortcut based on the screen information of the managed user; and a display part to display the created operating screen.

12 Claims, 15 Drawing Sheets

(51) Int. Cl.
  *H04N 1/00* (2006.01)
  *G06F 3/0481* (2013.01)
  *H04N 1/44* (2006.01)

(52) U.S. Cl.
  CPC ........ *G06K15/005* (2013.01); *H04N 1/00408* (2013.01); *H04N 1/00474* (2013.01); *H04N 1/00503* (2013.01); *H04N 1/00514* (2013.01); *H04N 1/00954* (2013.01); *G06F 3/1258* (2013.01); *G06F 3/1285* (2013.01); *H04N 1/4406* (2013.01); *H04N 2201/0094* (2013.01)

(56) References Cited

U.S. PATENT DOCUMENTS

| | | | |
|---|---|---|---|
| 2005/0041993 | A1 | 2/2005 | Barry et al. |
| 2005/0231758 | A1* | 10/2005 | Reynolds ........... G03G 15/5075 358/1.15 |
| 2006/0050307 | A1 | 3/2006 | Koike |
| 2007/0008583 | A1 | 1/2007 | Araki |
| 2007/0044040 | A1 | 2/2007 | Takahashi et al. |
| 2007/0133044 | A1 | 6/2007 | Tanaka |
| 2007/0147230 | A1* | 6/2007 | Yasuda ............. H04N 1/00291 370/214 |
| 2008/0229247 | A1* | 9/2008 | Bamba .................... 715/835 |
| 2009/0046057 | A1 | 2/2009 | Umezawa |
| 2009/0305732 | A1* | 12/2009 | Marcellino et al. .......... 455/466 |
| 2010/0122187 | A1 | 5/2010 | Kunori et al. |
| 2011/0058189 | A1 | 3/2011 | Kuwamura |
| 2011/0170138 | A1 | 7/2011 | Takahashi et al. |
| 2012/0023451 | A1 | 1/2012 | Kuroyanagi |
| 2013/0080968 | A1* | 3/2013 | Hanson ................. G06F 9/4443 715/783 |

FOREIGN PATENT DOCUMENTS

| | | |
|---|---|---|
| JP | 2004-181775 | 7/2004 |
| JP | 2006-069117 | 3/2006 |
| JP | 2006-243846 | 9/2006 |
| JP | 2007-049268 | 2/2007 |
| JP | 2007-049677 | 2/2007 |
| JP | 2009-070365 | 4/2009 |
| JP | 2009-217586 | 9/2009 |
| JP | 2010-074522 | 4/2010 |
| JP | 2010-114825 | 5/2010 |
| JP | 2011-059958 | 3/2011 |
| JP | 2012-027662 | 2/2012 |

OTHER PUBLICATIONS

Japanese Office Action dated Aug. 2, 2016.

* cited by examiner

FIG.3

| LOCATION ID | COORDINATES | ICON ID | DISPLAY SCREEN OWNER ID (APPLICATION ID) | REGISTRATION NO. | JOB ID | JOB INFORMATION |
|---|---|---|---|---|---|---|
| 001 | (10,200) | ID0001 | 0001 (COPY) | — | — | — |
| 002 | (190,200) | ID0007 | 0007 (DOCUMENT BOX) | — | — | — |
| 003 | (370,200) | ID0004 | 0004 (FAX) | — | — | — |
| 004 | (550,200) | ID0003 | 0003 (PRINTER) | — | — | — |
| 005 | (10,100) | ID0002 | 0002 (SCANNER) | — | — | — |
| 006 | (190,200) | ID0001 | 0001 (DUPLEX 2-IN-1) | 1 | — | — |
| 007 | (370,200) | ID0002 | 0002 (TRANSMIT TO MR. X) | 10 | — | — |
| 008 | (570,200) | ID0004 | 0004 (BUSINESS OFFICE Y) | 100 | — | — |
| ... | ... | ... | ... | ... | ... | ... |

FIG.4

| LOCATION ID | COORDINATES | ICON ID | DISPLAY SCREEN OWNER ID (APPLICATION ID) | REGISTRATION NO. | JOB ID | JOB INFORMATION |
|---|---|---|---|---|---|---|
| 001 | (10,200) | ID0003 | 0003 (PRINTER) | — | 100 | FILENAME |
| 002 | (190,200) | | | — | — | — |
| 003 | (370,200) | | | — | — | — |
| 004 | (550,200) | | | — | — | — |
| 005 | (10,100) | ID0001 | 0001 (COPY) | — | — | — |
| 006 | (190,200) | ID0007 | 0007 (DOCUMENT BOX) | — | — | — |
| 007 | (370,200) | ID0004 | 0004 (FAX) | — | — | — |
| 008 | (570,200) | ID0003 | 0003 (PRINTER) | — | — | — |
| ... | ... | ... | ... | ... | ... | ... |

FIG.5
| ICON ID | ICON IMAGE DATA |
|---------|-----------------|
| ID0001  |  |
| ID0002  |  |
| ID0003  |  |
| ...     | ...             |
| ID1011  |  |

FIG.6

| REGISTRATION NO. | REGISTERED NAME | OPERATION SETTINGS | | | | | |
|---|---|---|---|---|---|---|---|
| | | SETTINGS 1 | SETTINGS 2 | SETTINGS 3 | SETTINGS 4 | SETTINGS 5 | |
| 1 | DUPLEX 2-IN-1 | ... | ... | ... | ... | ... | ... |
| 10 | TRANSMIT TO MR. X | ... | ... | ... | ... | ... | ... |
| 100 | BUSINESS OFFICE Y | ... | ... | ... | ... | ... | ... |
| | <NO ENTRY> | — | — | — | — | — | — |
| | <NO ENTRY> | — | — | — | — | — | — |

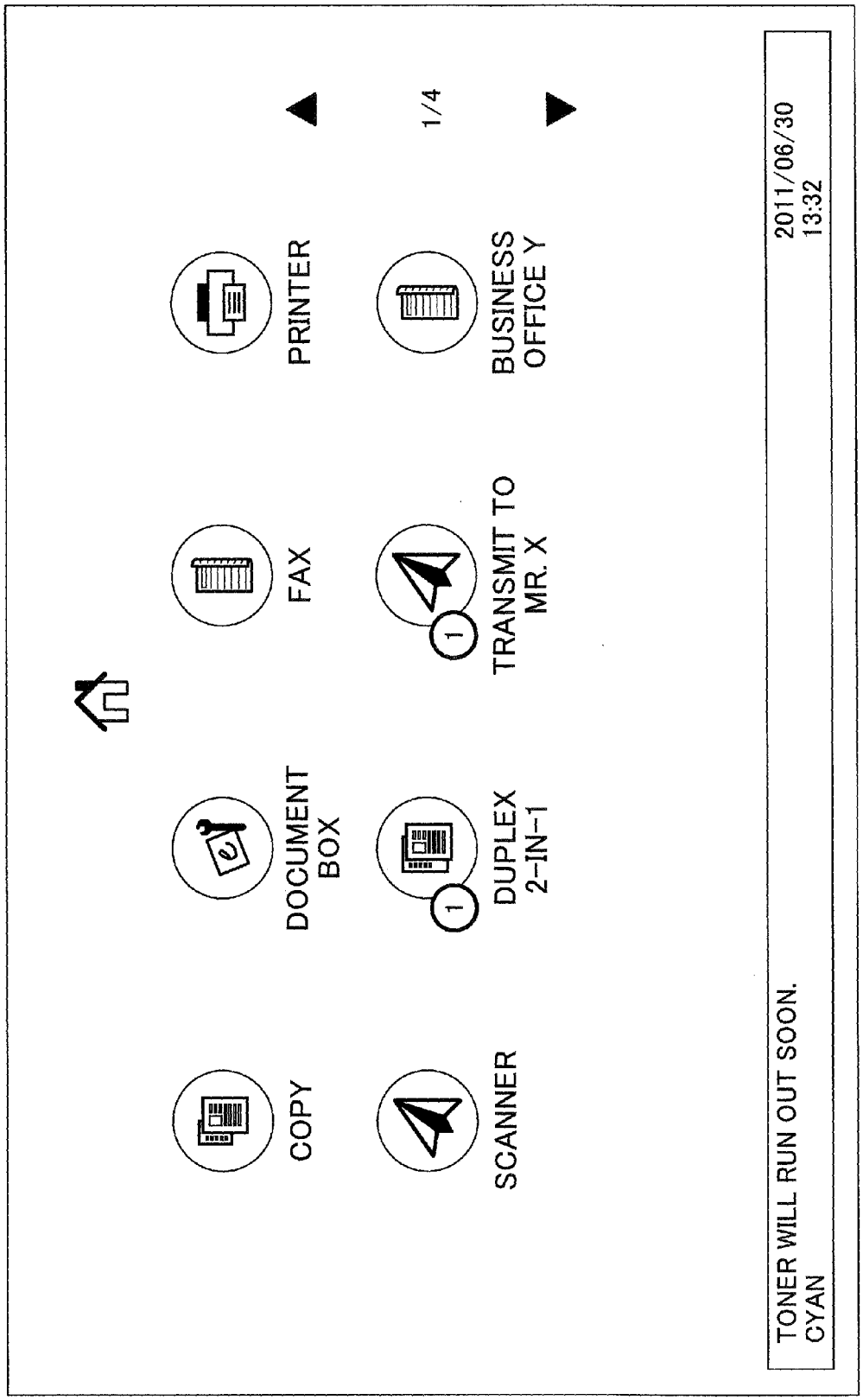

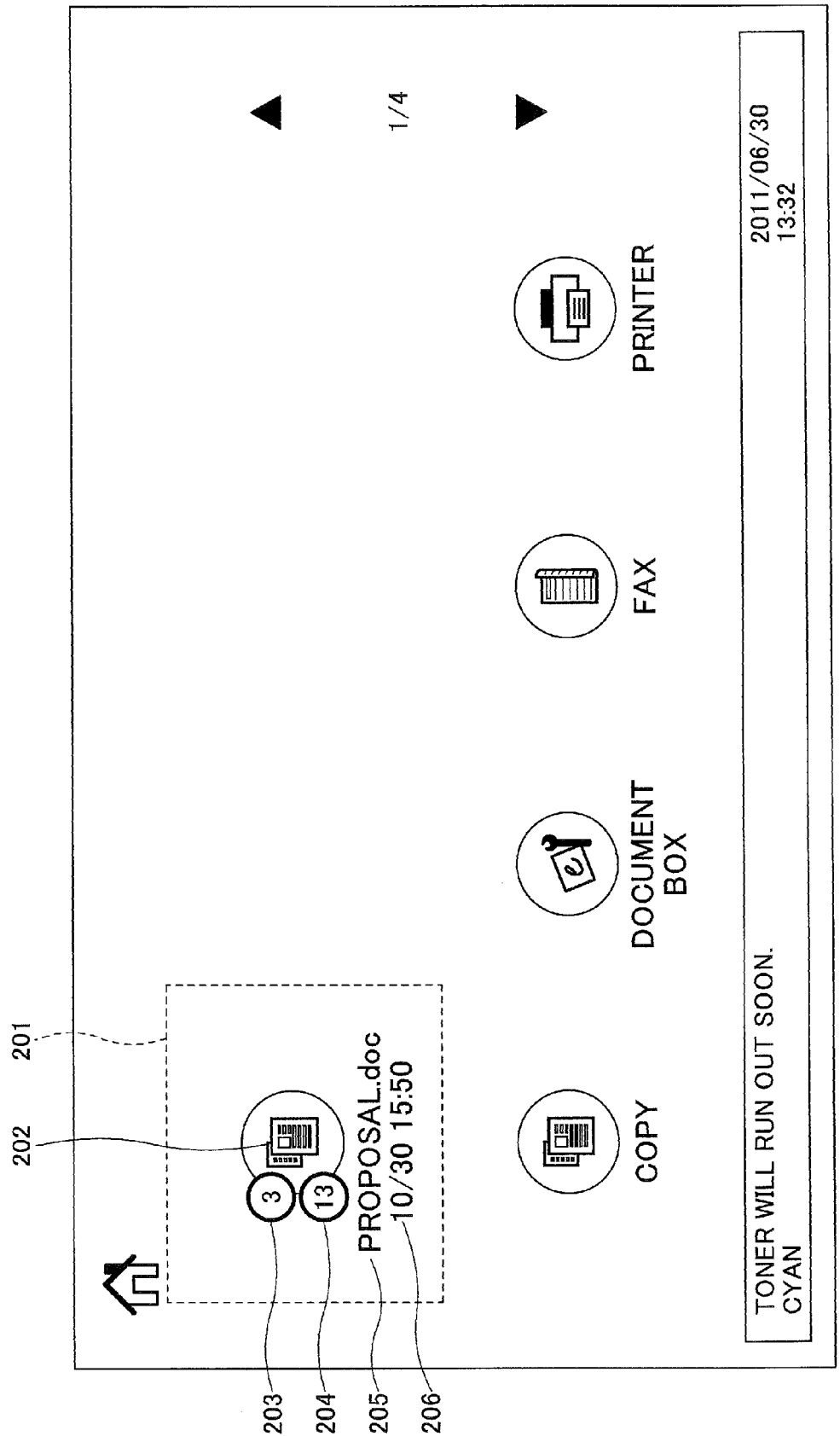

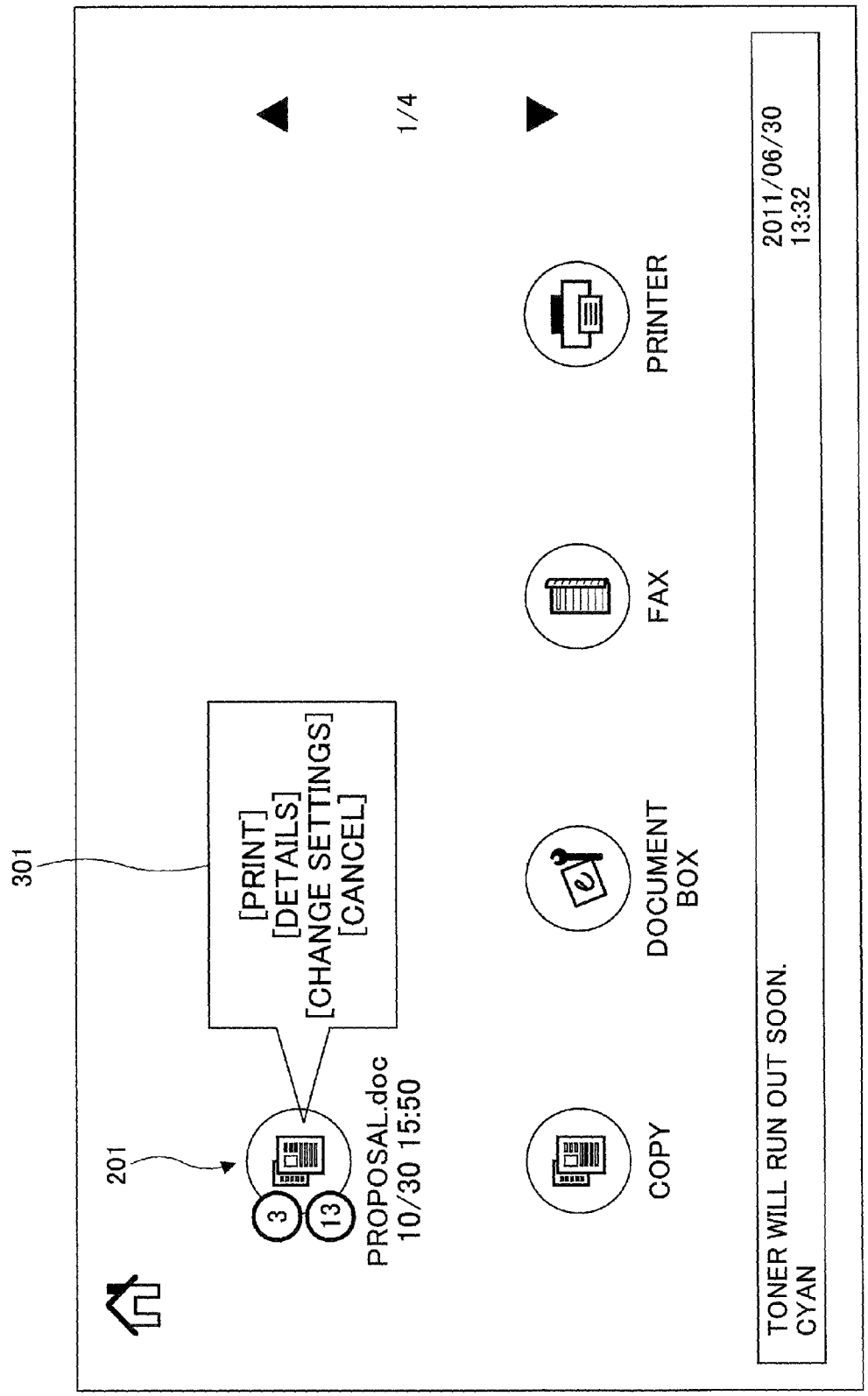

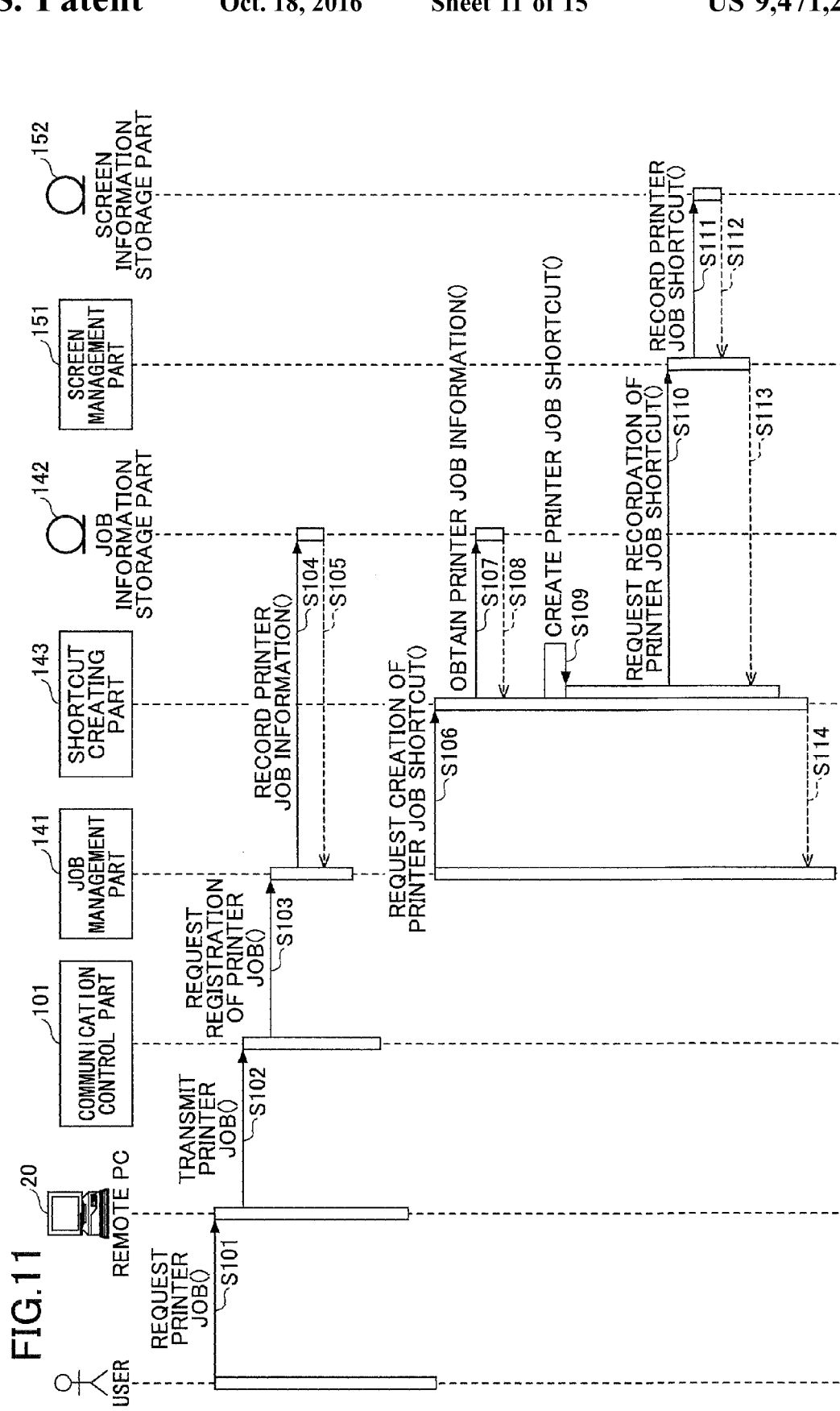

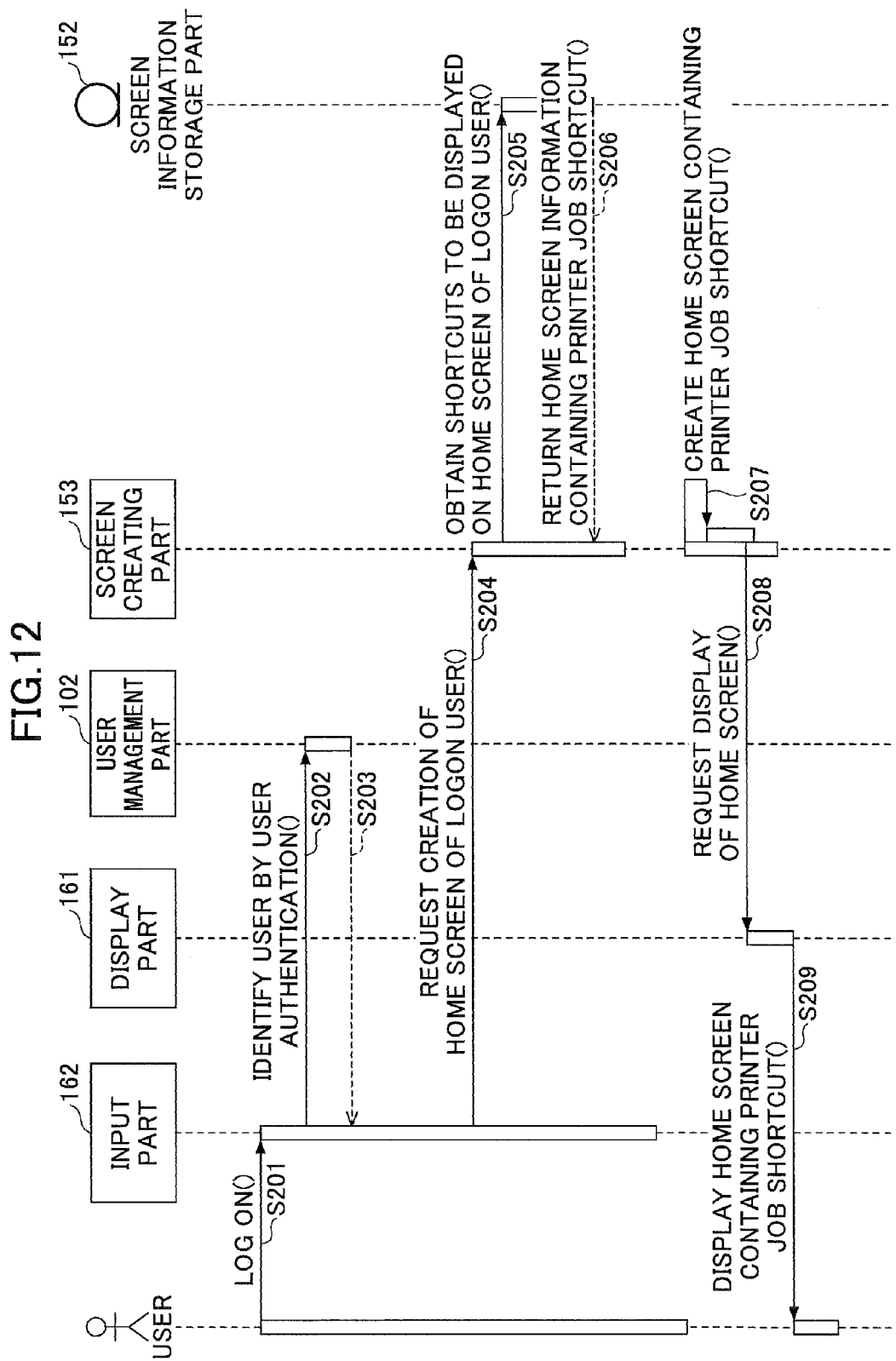

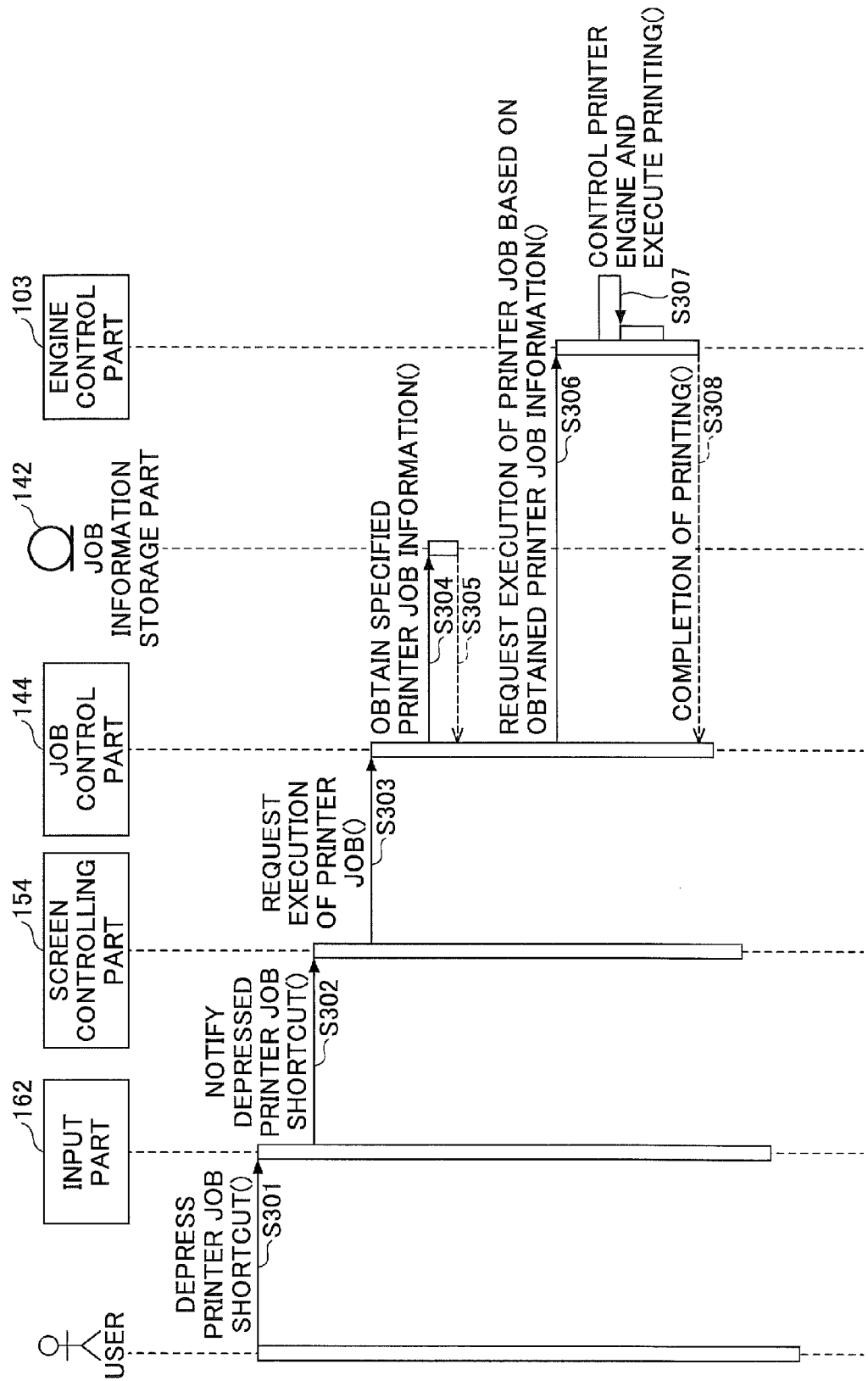

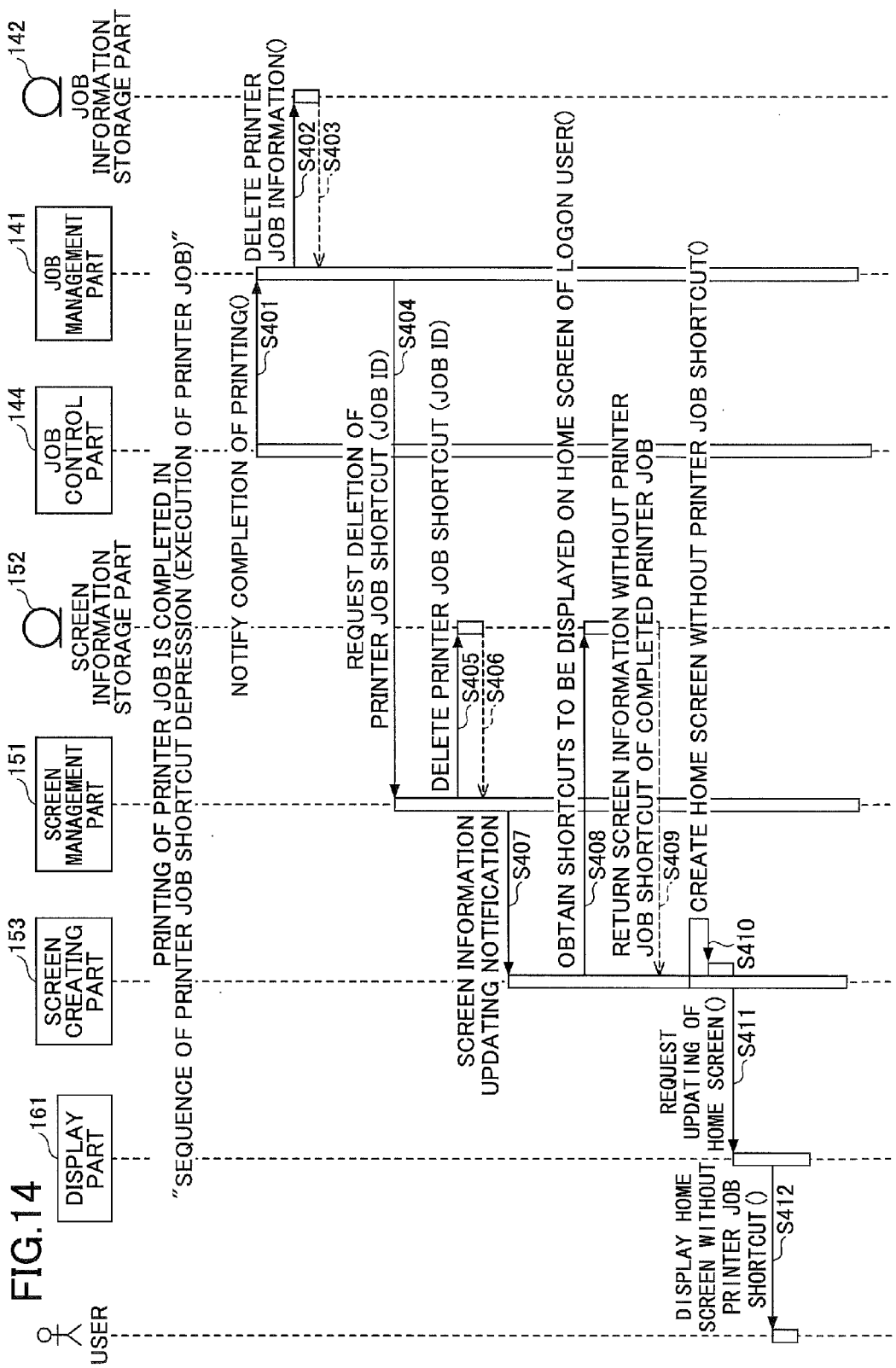

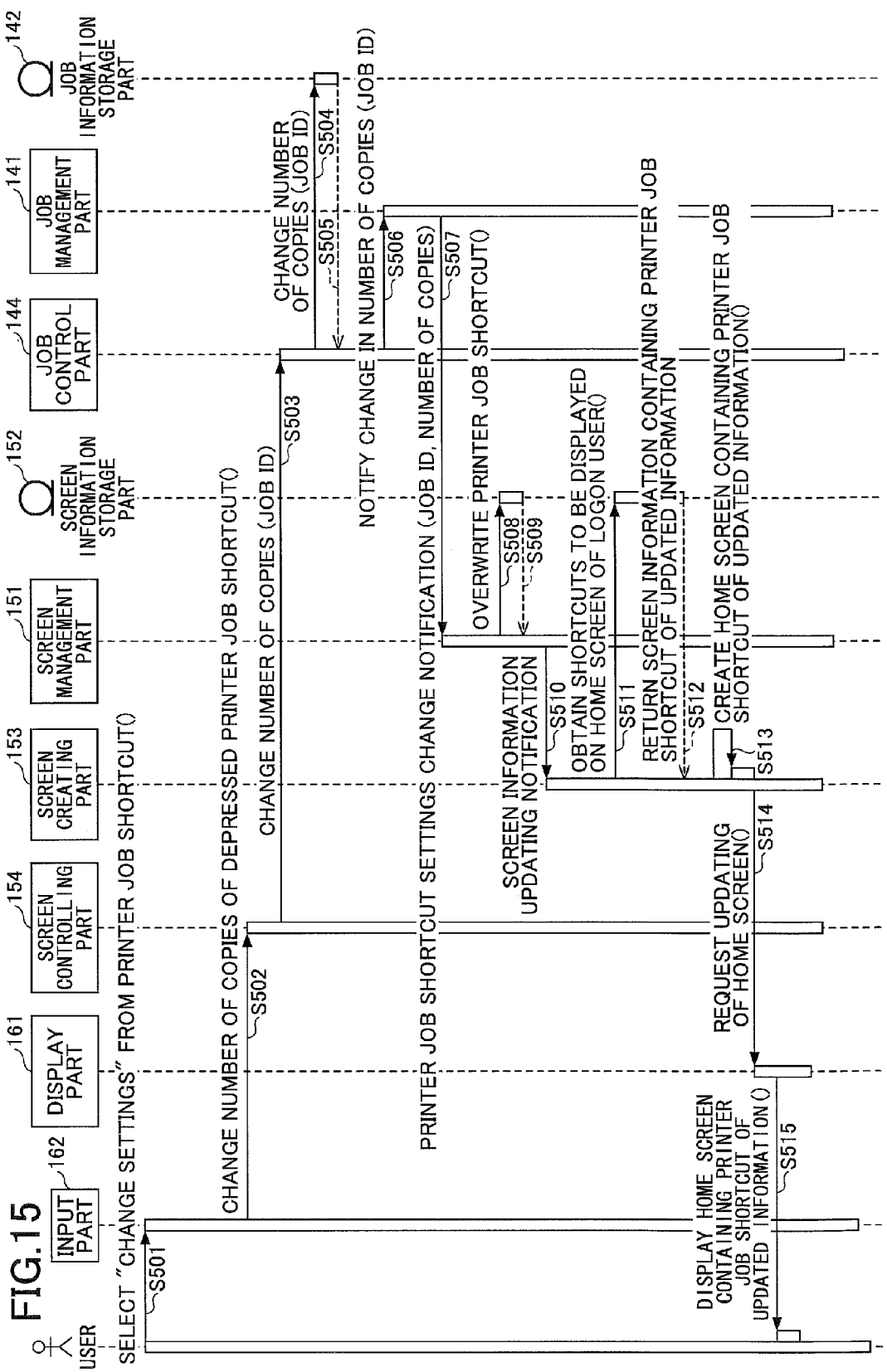

IMAGE PROCESSING APPARATUS, DISPLAY CONTROL METHOD, AND RECORDING MEDIUM

CROSS-REFERENCE TO RELATED APPLICATIONS

The present application is a continuation of U.S. patent application Ser. No. 14/182,366, filed on Feb. 18, 2014, which is a continuation of U.S. patent application Ser. No. 13/534,157, filed on Jun. 27, 2012, which is based upon and claims the benefit of priority of Japanese Patent Application No. 2011-163350, filed on Jul. 26, 2011. The disclosures of the prior applications are hereby incorporated herein in their entirety by reference.

BACKGROUND OF THE INVENTION

1. Field of the Invention

The present invention relates to an image processing apparatus and a display control method that display an operating screen containing a shortcut for calling an application, and to a computer-readable recording medium storing a program for causing a computer to execute the display control method.

2. Description of the Related Art

In recent years, it has been known in multifunction machines to provide a highly operable user interface (UI) by causing a shortcut icon (hereinafter also referred to simply as "shortcut") for calling an application to be displayed on a screen for operating applications (hereinafter also referred to as "application operating screen"), such as a home screen.

Further, a macro is known that presents a function that makes it possible to record the setting values of applications in advance, and it is possible to provide a shortcut for this macro. As a technique using this macro, for example, Japanese Laid-Open Patent Application No. 2010-114825 discloses a UI that makes it easier to call recorded information in order to increase operability.

SUMMARY OF THE INVENTION

According to an aspect of the invention, an image processing apparatus includes a screen information storage part configured to store, on a user basis, screen information of an operating screen containing a shortcut for calling an application; a shortcut creating part configured to, in response to receiving a request for a job of the application from an information processor connected to the image processing apparatus via a network, create a job shortcut for executing the job based on information of the requested job, and make a request for updating the screen information of a user who has requested the job; a screen management part configured to, in response to receiving the request for updating the screen information, add information of the job shortcut created by the shortcut creating part to the screen information of the user who has requested the job; a user management part configured to authenticate and manage the user; a screen creating part configured to create the operating screen containing the job shortcut based on the screen information of the user managed by the user management part; and a display part configured to display the operating screen created by the screen creating part.

According to an aspect of the invention, a display control method, executed by an image processing apparatus including a screen information storage part configured to store, on a user basis, screen information of an operating screen containing a shortcut for calling an application, includes a creating step of creating, in response to receiving a request for a job of the application from an information processor connected to the processing apparatus via a network, a job shortcut for executing the job based on information of the requested job; a requesting step of making a request for updating the screen information of a user who has requested the job using information of the created job shortcut; an updating step of adding, in response to receiving the request for updating the screen information, the information of the created job shortcut to the screen information of the user who has requested the job; an authenticating step of authenticating the user; a creating step of creating the operating screen containing the job shortcut based on the screen information of the authenticated user; and a display step of displaying the created operating screen.

According to an aspect of the invention, a non-transitory, computer-readable recording medium stores a display control program to be executed by an image processing apparatus including a screen information storage part configured to store, on a user basis, screen information of an operating screen containing a shortcut for calling an application, wherein the display control program instructs a processor of the image processing apparatus to perform a creating step of creating, in response to receiving a request for a job of the application from an information processor connected to the image processing apparatus via a network, a job shortcut for executing the job based on information of the requested job; a requesting step of making a request for updating the screen information of a user who has requested the job using information of the created job shortcut; an updating step of adding, in response to receiving the request for updating the screen information, the information of the created job shortcut to the screen information of the user who has requested the job; an authenticating step of authenticating the user; a creating step of creating the operating screen containing the job shortcut based on the screen information of the authenticated user; and a display step of displaying the created operating screen.

The object and advantages of the embodiment will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 3 is a diagram illustrating an example of screen information containing various kinds of information for displaying a home screen according to this embodiment;

FIG. 4 is a diagram illustrating another example of the screen information containing various kinds of information for displaying the home screen according to the embodiment;

FIG. 5 is a diagram illustrating an example of icon image information according to the embodiment;

FIG. 6 is a diagram illustrating an example of macro registration information according to the embodiment;

FIG. 8 is a diagram illustrating an example of the home screen according to the embodiment;

FIG. 9 is a diagram illustrating another example of the home screen according to the embodiment;

FIG. 10 is a diagram illustrating an example of a balloon displayed at the time of depression of a job shortcut according to the embodiment;

FIG. 11 is a sequence diagram illustrating a job shortcut creating process according to the embodiment;

FIG. 12 is a sequence diagram illustrating a job shortcut displaying process according to the embodiment;

FIG. 13 is a sequence diagram illustrating a process at the time of depressing a job shortcut according to the embodiment;

FIG. 14 is a sequence diagram illustrating a job shortcut deleting process according to the embodiment; and FIG. 15 is a sequence diagram illustrating a job settings changing process according to the embodiment.

DETAILED DESCRIPTION OF THE PREFERRED EMBODIMENTS

The conventional shortcut allows an operation of the operation part of an image processing apparatus to be called with a single operation (single step). However, a request for a job of an application transmitted from a remote personal computer (PC) to the image processing apparatus is not executable from a shortcut on the operating screen. Therefore, such an operation is necessary as selecting the job desired to be executed after once switching to the screen of the application or displaying a list of jobs and selecting the job desired to be executed from the list, thus resulting in the inconvenience of a large number of operation steps.

According to an aspect of the present invention, it is possible to execute a job of an application transmitted from a remote PC with a reduced number of operation steps.

According to an aspect of the invention, an image processing apparatus and a display control method are provided that make it possible to execute a job of an application transmitted from a remote PC with a reduced number of operation steps, and a computer-readable recording medium is provided that stores a program for causing a computer to execute the display control method.

A description is given, with reference to the accompanying drawings, of an embodiment of the present invention. In the following description, a multifunction peripheral (MFP) is taken as an example of the image processing apparatus.

Figure 1:
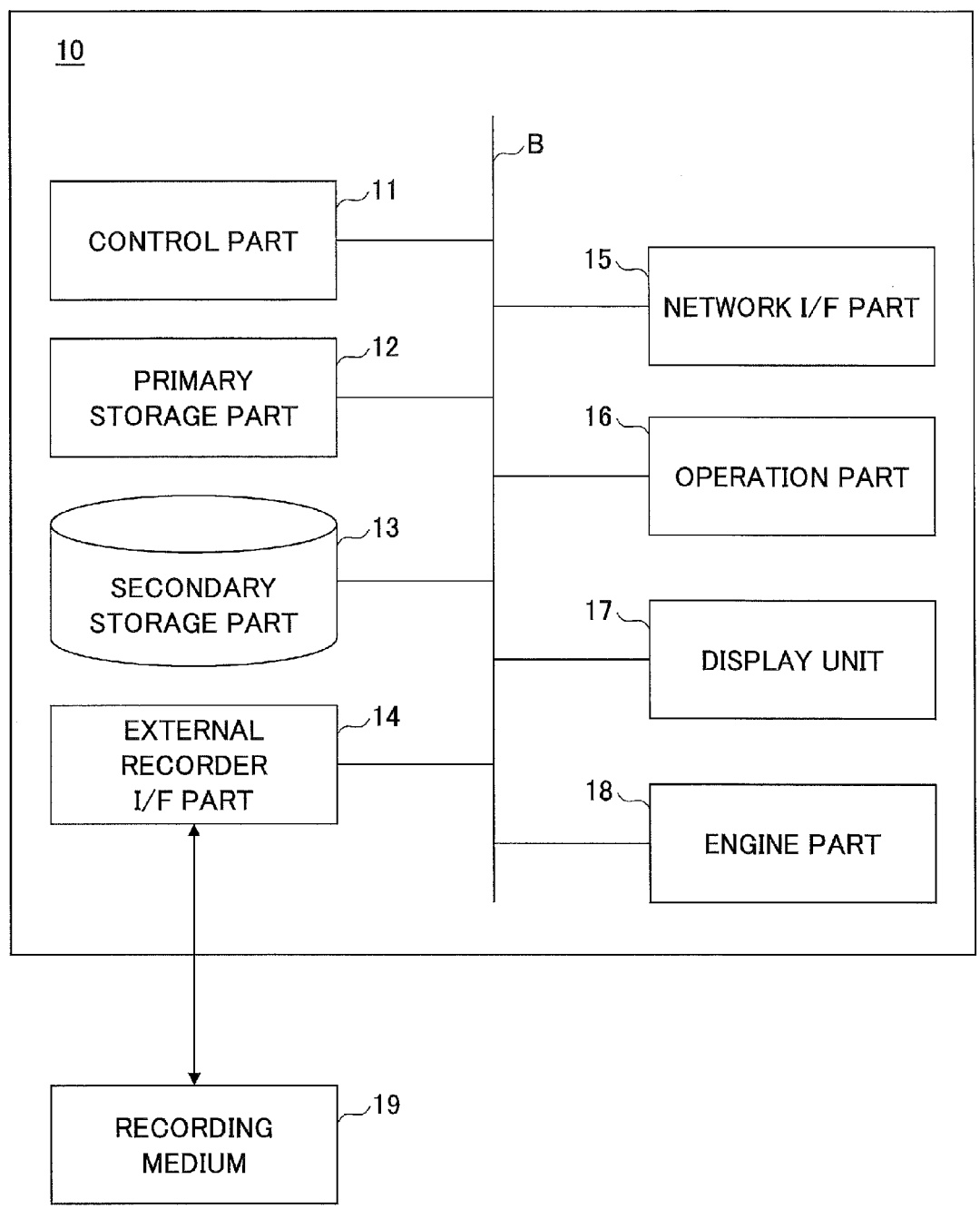
FIG. 1 is a block diagram illustrating a hardware configuration of an MFP according to an embodiment.

FIG. 1 is a block diagram illustrating a hardware configuration of an MFP 10 according to the embodiment. As illustrated in FIG. 1, the MFP 10 includes a control part 11, a primary storage part 12, a secondary storage part 13, an external recorder interface (I/F) part 14, a network I/F part 15, an operation part 16, a display unit 17, and an engine part 18, which are interconnected via a bus B to transmit data to and receive data from one another.

The control part 11 includes a processor such as a central processing unit (CPU) that controls parts and performs operations on and processes data in a computer. Further, the control part 11, which is a computing unit that executes programs stored in the primary storage part 12 and the secondary storage part 13, receives data from an input device or a storage device, performs operations on and processes the received data, and outputs the processed data to an output device or the storage device.

The primary storage part 12 includes a read-only memory (ROM) and a random access memory (RAM). The primary storage part 12 is a storage device that stores or temporarily saves programs and data, such as an operating system (OS), which is basic software, and application software executed by the control part 11.

The secondary storage part 13, which includes a hard disk drive, is a storage device that stores data related to application software.

The external recorder I/F part 14 is an interface between the MFP 10 and a recording medium (such as a flash memory, an SD card or the like) connected to the MFP 10 via a data transmission channel such as a universal serial bus (USB).

A predetermined program may be stored in the recording medium 19, so that the program stored in the recording medium 19 may be installed in the MFP 10 via the external recorder I/F part 14. The installed predetermined program may be executed by the MFP 10.

The network I/F part 15 is an interface between the MFP 10 and peripheral devices with a communication function connected to the MFP 10 via a network constructed with data transmission channels including cables and/or radio links, such as a local area network (LAN) or a wide area network (WAN).

The operation part 16 and the display unit 17, which include a liquid crystal display (LCD) having key switches (hard keys) and a touchscreen panel function (including graphical user interface [GUI] software keys), is a display and/or input device that operates as a user interface (UI) in the case of using functions of the MFP 10.

The engine part 18, which is, for example, a printer engine, reads paper original (such as a paper document) and performs printing on transfer paper as an input/output unit for image data. The engine part 18 may include a scan engine and a facsimile (FAX) engine.

Figure 2:
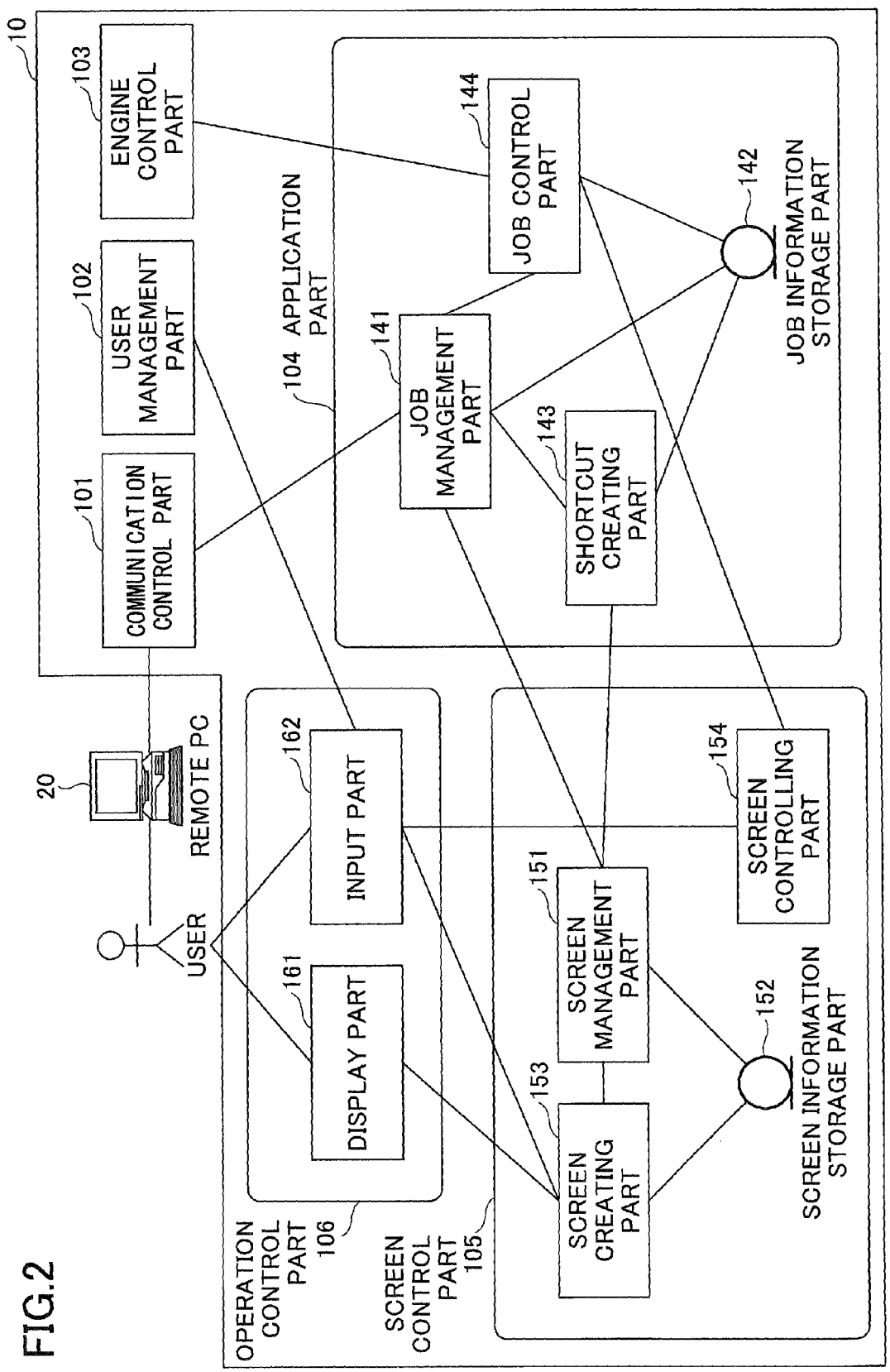
FIG. 2 is a block diagram illustrating a functional configuration of the MFP according to the embodiment.

Next, a description is given of functions of the MFP 10. FIG. 2 is a block diagram illustrating a functional configuration of the MFP 10 according to this embodiment. The MFP 10 includes a communication control part 101, a user management part 102, an engine control part 103, an application part 104, a screen control part 105, and an operation control part 106.

The communication control part 101 receives a request for a job of an application (a job to be executed by an application) (hereinafter also referred to as "application job") transmitted from a remote PC 20 to the MFP 10 by a user. The communication control part 101 is connected to external terminals (such as the remote PC 20) by a LAN or the like.

The user management part 102 performs user authentication using a user ID and a password input from an input part 162 of the operation control part 106, and manages authenticated users. The user management part 102 transmits authentication results to the input part 162.

The user management part 102 may perform user authentication based on a user ID read from a user ID card through a physical contact with the user ID card or in a contactless manner. The user management part 102 notifies the input part 162 of the result of the user authentication performed according to a known authentication method.

The engine control part 103 is a control part for executing applications of the MFP 10. For example, in the case of a printer application, the engine control part 103 controls printing on and the conveyance of paper. In the case of a FAX application, the engine control part 103 controls the reading of original material and the transmission of read image data.

The application part 104 is implemented by an application executable by the MFP 10. For example, the application part 104 may be a printer application, a copy application, a FAX application, a scan application or the like. The application part 104 includes a job management part 141, a job information storage part 142, a shortcut creating part 143, and a job control part 144.

The job management part 141 receives, from the communication control part 101, the request for the application job transmitted from the remote PC 20 to the MFP 10 by the user. The job management part 141 assigns a job ID to information on the application job (hereinafter also referred to as "job information"), and stores the job information in the job information storage part 142.

Further, the job management part 141 manages the job information, and updates the job information stored in the job information storage part 142 in conjunction with reception, execution, and deletion of an application job. Upon completion of the storage of the job information, the job management part 141 makes a request for creation of a shortcut (shortcut creating request) to the shortcut creating part 143.

Further, when there is a change in the setting values of a job, the job management part 141 notifies a screen management part 151 of the screen control part 105 of the details of the change.

The job information storage part 142 stores (contains) the job information received by the MFP 10 in correlation with the job ID.

When the application job is a printer job, the job information includes information on a user who has requested (transmitted a request for) the job, a filename, a print image, paper size, the number of pages, the number of copies, and a job (request) transmission date and time. The job information storage part 142 stores (contains) job information including the setting items of jobs on an application basis. A description is given below, with reference to FIG. 7, of the details of the job information.

In response to receiving the shortcut creating request from the job management part 141, the shortcut creating part 143 creates a shortcut for executing the application job (hereinafter also referred to as "job shortcut") from information obtained from the job information storage part 142. The information obtained from the job information storage part 142 includes, for example, a job ID, an application ID, and the setting values of the job setting items.

The job shortcut allows a user to have the application job stored in the job information storage part 142 executed by depressing the job shortcut.

Upon creation of the job shortcut, the shortcut creating part 143 requests the screen management part 151 to update the screen information of the operating screen, using the information of the job shortcut. The information of the job shortcut includes, for example, a job ID, an application ID, and a user ID. A description is given below, with reference to FIG. 7, of the details of the job shortcut.

In response to being notified of a job ID corresponding to the job shortcut by a screen controlling part 154 of the screen control part 105, the job control part 144 requests the engine control part 103 to execute the application job corresponding to the job ID. For example, the job control part 144 controls the execution of the job based on the job information with the job ID of which the job control part 144 has been notified, that is, has received from the screen controlling part 154, stored in the job information storage part 142.

Further, in response to being notified of a change in the job settings by the screen controlling part 154, the job control part 144 changes the setting values of the setting items in the job information stored in the job information storage part 142 based on the details of the change in the job settings of which the job control part 144 has been notified.

The screen control part 105 controls the operating screen. The operating screen contains a shortcut for calling an application. The operating screen may contain a shortcut for calling a macro. Further, the operating screen may be a home screen, which is displayed on the display unit 17 as a default screen after user authentication.

The screen control part 105 includes the screen management part 151, a screen information storage part 152, a screen creating part 153, and the screen controlling part 154.

The screen management part 151 manages the screen information of the operating screen. In response to receiving a request to update the screen information from the shortcut creating part 143 of the application part 104, the screen management part 151 adds information on the created job shortcut (job shortcut information) to the screen information of a user who has requested (execution of) the job.

The screen information includes the position of a shortcut, the icon ID of a shortcut, an application ID, the registration number of a macro, and a job ID. A description is given below, with reference to FIG. 3, of the details of the screen information.

Further, in adding the job shortcut information, the screen management part 151 may add the job shortcut information to the screen information so that the job shortcut may be displayed with preference (over other shortcuts) on the operating screen. This makes it easier to locate the job shortcut on the operating screen, thus allowing a user to have the job requested from the remote PC 20 executed immediately.

Further, in adding the job shortcut information, the screen management part 151 may add the job shortcut information to the screen information so that the display position of the job shortcut on the operating screen may be changed in accordance with the application of the job shortcut, that is, the job shortcut may be displayed at different positions on the operating screen depending on the application of the job shortcut. This makes it possible to cause the display position of the job shortcut to differ on an application basis by prioritizing applications, thus making it possible to give higher priority to a job lasting for a shorter time in displaying jobs.

The screen information storage part 152 stores (contains) the screen information of the operating screen on a user basis. The operating screen may be customized on a user basis. Further, the screen information storage part 152 stores (contains) icon image information indicating icon images for displaying shortcuts and macro registration (recording) information indicating the setting values of macros.

In response to being notified of a user who has logged on to the MFP 10 by the input part 162 of the operation control part 106, the screen creating part 153 refers to the screen information of the user who has logged on in the screen information storage part 152, and creates the operating screen by placing a shortcut or a job shortcut at a predetermined position. The screen creating part 153 outputs the created operating screen to a display part 161 of the operation control part 106.

The screen controlling part 154 identifies the job ID of the job to be executed in accordance with the shortcut on the operating screen depressed by a user using the input part 162. The screen controlling part 154 notifies the job control part 144 of the application part 104 of the identified job ID and requests the job control part 144 to have the job executed.

The operation control part 106 controls the operations panel (the operation part 16 and the display unit 17) of the MFP 10. The operation control part 106 includes the display part 161 and the input part 162.

The display part 161 displays the operating screen created by the screen creating part 153 to a user. The operating screen includes a home screen created on a user basis.

The input part 162 detects (determines) a shortcut depressed by a user. The input part 162 identifies (determines) which application or which application's job has been depressed based on the position of the depressed shortcut, and notifies the screen controlling part 154 of the screen control part 105 which application or which application's job has been depressed.

The above-described configuration allows the MFP 10 to display, on the operating screen, a shortcut for executing a job requested from the remote PC 20, and to reduce the number of operation steps for executing the job.

The communication control part 101 may be implemented by, for example, the network I/F part 15. The user management part 102, the application part 104, and the screen control part 105 may be implemented by, for example, the control part 11 and the primary storage part 12 as a work memory. The engine control part 103 may be implemented by, for example, the control part 11 and/or the engine part 18. The operation control part 106 may be implemented by, for example, the operation part 16 and the display unit 17.

Next, a description is given of the data structures of various kinds of data used in the MFP 10. In the following description, a home screen created on a user basis is taken as an example of the operating screen, and a printer job is taken as an example of the application job.

A description is given of the screen information.

FIG. 3 is a diagram illustrating an example of the screen information containing various kinds of information for displaying a home screen. It is assumed that the home information illustrated in FIG. 3 is, for example, a home screen for a user A. The screen information is stored in the screen information storage part 152 of the screen control part 105 (FIG. 2). The screen information illustrated in FIG. 3 is stored in correlation with, for example, the user ID of the user A.

The screen information retains a location ID, coordinates, an icon ID, a display screen owner ID (application ID), a registration number, a job ID, and job information in correlation with one another. The location ID indicates a number for identifying the location of a shortcut. The coordinates indicate coordinate information on the home screen. The icon ID indicates a number corresponding to an icon image displayed in the shortcut.

The display screen owner ID indicates a number for identifying an application for display the operating screen of the application. The registration number indicates a registration number for identifying a macro. The job ID indicates a number for identifying a job requested from the remote PC 20. The number assigned as the job ID differs from application to application. The job information indicates information on the job (job information) obtained from the shortcut creating part 143 of the application part 104 (FIG. 2).

FIG. 3 illustrates an example of the screen information in the case where no execution of an application job is requested by the remote PC 20.

Further, in the case illustrated in FIG. 3, shortcuts for applications and shortcuts for macros are placed on the same home screen. For example, a copy shortcut for a copy application, whose location ID is "1," and a duplex 2-in-1 shortcut for the copy application, whose location ID is "6," are displayed on the same home screen. Further, the name of the shortcut is indicated in parentheses subsequent to the display screen owner ID. The name of the shortcut may be managed separately from the display screen owner ID.

FIG. 4 is a diagram illustrating another example of the screen information containing various kinds of information for displaying a home screen. FIG. 4 illustrates an example of the screen information in the case where the execution of a printer job is requested by the remote PC 20.

In the case illustrated in FIG. 4, job shortcut information is added to the screen information so that a shortcut for the job ID "100" of the printer job is preferentially displayed at the left end of the first line on the home screen. In FIG. 4, a filename is shown as the job information, but the job information may further include other information items such as the number of copies, the number of pages, a transmission date and time, and a thumbnail. The thumbnail is created by reducing the resolution of a first one of images to be printed by the shortcut creating part 143. This allows a user to imagine a print result by having a look at the icon image of the job shortcut.

In the case illustrated in FIG. 4, location IDs "2" through "4" are open. However, the location IDs "2" through "4" may not be open. In the case of adding job shortcut information, the screen management part 151 of the screen control part 105 first adds the job shortcut information to the bottom of the screen information illustrated in FIG. 3. Then, the screen management part 151 may perform sorting (on the screen information) so that the job shortcut information corresponds to the smallest location ID in order to preferentially display a shortcut with a job ID.

The screen management part 151 may also sort the screen information so that job shortcuts are displayed on the first line of the first page of the home screen while shortcuts for regular applications are displayed on the second (next) and subsequent lines.

Further, the screen management part 151 may sort the job shortcut information in accordance with applications that execute jobs corresponding to job shortcuts. It may be optional for the screen management part 151 to sort the job shortcut information.

Next, a description is given of icon image information.

FIG. 5 is a diagram illustrating an example of the icon image information. The icon image information illustrated in FIG. 5 correlates icon IDs with corresponding icon images (icon image data) for shortcuts. The icon images are registered (recorded) in advance. The icon image information is stored in the screen information storage part 152 of the screen control part 105 (FIG. 2).

Next, a description is given of micro registration information.

FIG. 6 is a diagram illustrating an example of the macro registration information. As illustrated in FIG. 6, in the macro registration information, registered names and operation settings are retained in correlation with corresponding registration numbers. Macros are registered in advance by a user. The registration numbers in the macro registration information are linked to registration numbers in the screen information of the home screen (FIG. 3 and FIG. 4).

For example, with respect to the macro function of a registration number "1," the registered name is "duplex 2-in-1," and operations settings are stored in the macro registration information. The same is the case with registration numbers "10" and "100." The macro registration numbers are managed separately on an application basis.

A description is given of job information and job shortcut information.

Figure 7:
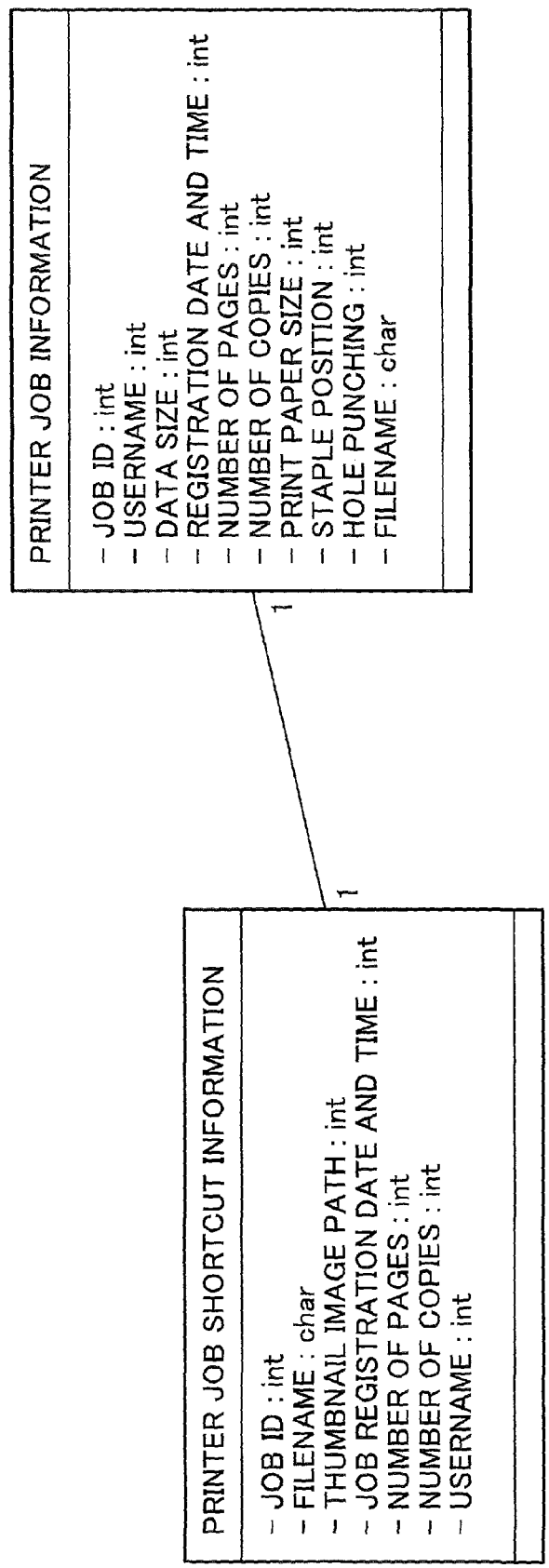
FIG. 7 is a diagram illustrating an example of job information and an example of job shortcut information according to the embodiment.

FIG. 7 is a diagram illustrating an example of the job information and an example of the job shortcut information. By way of example, FIG. 7 illustrates data on a printer job. The printer job information illustrated in FIG. 7 includes a job ID, a username, data size, a registration date and time, the number of pages, the number of copies, print paper size, a staple position, hole punching, and a filename. The printer job information is stored in the job information storage part 142 of the application part 104 (FIG. 2).

The job shortcut information illustrated in FIG. 7 includes a job ID, a filename, a thumbnail image path, a job registration date and time, the number of pages, the number of copies, and a username. The job shortcut information is created by extracting information from the job information by the shortcut creating part 143 of the application part 104.

The shortcut creating part 143 outputs the created job shortcut information to the screen management part 151. The screen management part 151 adds the obtained (received) job shortcut information to the screen information (as illustrated in FIG. 4).

Next, a description is given of a home screen.

FIG. 8 is a diagram illustrating an example of the home screen. FIG. 8 illustrates a home screen in the case where a user logs on to the MFP 10 without requesting a job from the remote PC 20.

The home screen illustrated in FIG. 8 is created based on the screen information illustrated in FIG. 3 by the screen creating part 153 of the screen control part 105. A list of shortcut icons (shortcuts) for calling applications and macros that record operation settings of applications is displayed on the home screen illustrated in FIG. 8.

For example, shortcuts for applications that are installed as standard applications, such as a copy application, a FAX application, and a printer application, are displayed. Further, for shortcuts for calling macros, the registration numbers of the macros are displayed. For example, the macro registration number "1" is displayed on the lower left of the "duplex 2-in-1" shortcut. The macro registration number may be provided at any position in the shortcut as long as the correspondence of the macro registration number to the shortcut is clear.

FIG. 9 is a diagram illustrating another example of the home screen. FIG. 9 illustrates a home screen in the case where a user logs on to the MFP 10 with a job requested from the remote PC 20.

The home screen illustrated in FIG. 9 is created based on the screen information illustrated in FIG. 4 by the screen creating part 153. A job shortcut 201 is preferentially placed on the home screen. While a filename is shown as an example of the job information in FIG. 4, it is assumed that the job information illustrated in FIG. 4 contains the job shortcut information (FIG. 7).

The screen creating part 153 obtains a predetermined number of information items from the job shortcut information, and displays the predetermined number of information items over the shortcut. For example, the icon of an application to be executed is displayed as an icon image 202, "3" is displayed as a number of copies 203, "13" is displayed as a number of pages 204, "proposal.doc" is displayed as a filename 205, and "10/30 15:50" is displayed as a registration date and time 206 over the job shortcut 201.

These information items of a predetermined number may be given by presetting items that represent the contents (details) of the job. As these information items of a predetermined number, at least information that distinguishes the job from another job, such as a filename or a registration date and time, may be displayed. It is not always necessary to display multiple information items.

The screen creating part 153 may determine in advance at which positions information items are placed. For example, it may be determined that the number of copies is placed on the upper left of the job shortcut and the number of pages is placed on the lower left of the job shortcut. Further, if the job information includes a filename and/or a registration date and time, the screen creating part 153 causes the filename and/or the registration date and time to be displayed preferentially as the name of the job shortcut.

If a thumbnail image path is set in the column of the job information of the screen information illustrated in FIG. 4, a thumbnail is displayed with preference as the icon image 202 of the job shortcut. If no thumbnail image path is set in the column of the job information, an icon image corresponding to an application for the job is displayed as the icon image 202 of the job shortcut.

In displaying the icon image of an application, the application may be identified from the job ID, for example. It may be determined, for example, that job IDs in the 100s are for a printer application, job IDs in the 200s are for a scanner application, and job IDs in the 300s are for a FAX application.

The placement (arrangement) positions of shortcuts in the presence of a job shortcut are not limited to those illustrated in FIG. 9.

FIG. 10 is a diagram illustrating an example of a balloon displayed at the time of depression of a job shortcut. In the case illustrated in FIG. 10, a balloon 301 is displayed in response to the depression of the job shortcut 201. The balloon 301 contains, for example, a UI component (for example, a button) for executing a job (printing) ("PRINT"), a UI component for displaying the detailed information of a job ("DETAILS"), a UI component for changing the settings of a job ("CHANGE SETTINGS"), and a UI component for canceling a job ("CANCEL"). The balloon 301 may be satisfactory if the balloon 301 contains at least the UI component for executing printing ("PRINT") and the UI component for canceling printing ("CANCEL").

This makes it possible to cancel a job or display the detailed information of a job from a job shortcut.

A print job is executed in response to the depression of the "PRINT" button illustrated in FIG. 10. The detailed information of a job is illustrated in response to the depression of the "DETAILS" button illustrated in FIG. 10. The detailed information of the job is, for example, the job information in the screen information. The job information in the screen information may include information that has been displayed. For example, the number of copies, a filename, the number of pages, a job ID, and a username are displayed as the detailed information.

In response to the depression of the "CHANGE SETTINGS" button illustrated in FIG. 10, the setting values of those of the setting items of a job which are changeable are displayed, thus making it possible for a user to change the job settings. In the case of a printer (print) job, setting items other than those generated on the remote PC 20 side and thus unchangeable, such as the number of copies and data size, may be changed.

These changeable setting items may be preset in the MFP 10 on an application basis. This allows the display part 161 of the operation control part 106 to display a settings change screen corresponding to the application after the input part 162 detects the depression of the "CHANGE SETTINGS" button.

A print job is canceled in response to the depression of the "CANCEL" button illustrated in FIG. 10. In response to the cancellation of the print job, the job shortcut of the print job is deleted from the home screen.

Next, a description is given of operations of the MFP 10 according to this embodiment.

A description is given in detail below of operations of a display control process of the MFP 10.

FIG. 11 is a sequence diagram illustrating a job shortcut creating process. In step S101 of FIG. 11, a user makes a request for execution of a printer job using the remote PC 20.

In step S102, the remote PC 20 transmits the printer job requested by the user to the communication control part 101 of the MFP 10. At this point, the user ID of the user who has made the request and the setting values of the job are also transmitted to the communication control part 101.

In step S103, the communication control part 101 requests the job management part 141 of the application part 104 to register (record) the received (requested) printer job.

In step S104, the job management part 141 records information on the printer job (printer job information) in the job information storage part 142 (FIG. 7).

In step S105, the job information storage part 142 notifies the job management part 141 of completion of the recordation (registration) of the printer job information in response to the completion of the recording of the printer job information.

In step S106, the job management part 141 requests the shortcut creating part 143 to create a shortcut for the printer job (printer job shortcut) in response to the completion of the recording of the printer job information.

In step S107 and step S108, the shortcut creating part 143 obtains the newly recorded printer job information from the job information storage part 142.

In step S109, the shortcut creating part 143 creates the printer job shortcut. At this point, the shortcut creating part 143 creates the information of the printer job shortcut (printer job shortcut information) by creating a thumbnail image and extracting the number of copies, the number of pages, and the user ID from the printer job information.

In step S110, the shortcut creating part 143 requests the screen management part 151 of the screen control part 105 to record (register) the printer job shortcut information or update the screen information.

In step S111, the screen management part 151 records (adds) the printer job shortcut information in the screen information corresponding to the user ID included in the printer job shortcut information in the screen information storage part 152.

In step S112, the screen information storage part 152 notifies the screen management part 151 of completion of the recordation of the printer job shortcut information. Thereafter, the screen management part 151 may rearrange the screen information so that the printer job shortcut information is preferentially displayed on the home screen.

In step S113, the screen management part 151 notifies the shortcut creating part 143 of the completion of the recordation of the printer job shortcut information.

In step S114, the shortcut creating part 143 notifies the job management part 141 of the completion of the recordation of the printer job shortcut information.

As a result, the printer job shortcut information is recorded in the screen information for displaying the home screen, so that the order of display of the home screen is determined.

FIG. 12 is a sequence diagram illustrating a job shortcut displaying process according to this embodiment.

In step S201 of FIG. 12, a user inputs data for user authentication to the input part 162 of the operation control part 106.

In step S202, the input part 162 requests the user management part 102 to perform user authentication using the input data and to identify the user.

In step S203, the user management part 102 performs user authentication, and notifies the input part 162 of the user ID of the identified (authenticated) user.

In step S204, the input part 162 specifies the user ID, and requests the screen creating part 153 of the screen control part 153 to create the home screen of the user who has logged on.

In step S205, the screen creating part 153 specifies the user ID, and requests the screen information storage part 152 to obtain (retrieve) information on shortcuts to be displayed on the home screen of the user who has logged on.

In step S206, the screen information storage part 152 returns the requested screen information corresponding to the user ID to the screen creating part 153.

In step S207, the screen creating part 153 creates a home screen containing a printer job shortcut based on the obtained screen information. The screen creating part 153 performs rendering based on the correspondence between shortcuts including the printer job shortcut and location IDs and coordinates.

In step S208, in response to completion of the creation of the home screen, the screen creating part 153 requests the display part 161 of the operation control part 106 to display the home screen.

In step S209, the display part 161 displays the home screen containing the printer job shortcut (FIG. 9).

As a result, it is possible for a user to cause an application job to be executed with "one touch" (a single operation). Further, since it is possible to place a job shortcut at a highly visible position on the home screen, it is possible for a user to locate the job shortcut immediately.

FIG. 13 is a sequence diagram illustrating a process at the time of depressing a job shortcut according to this embodiment.

In step S301 of FIG. 13, a user depresses a printer job shortcut.

In step S302, the input part 162 of the operation control part 106 identifies the depressed printer job shortcut, and notifies the screen controlling part 154 of the corresponding job ID.

In step S303, the screen controlling part 154 specifies the job ID of which the screen controlling part 154 has been notified, and requests the job control part 144 of the application part 104 to execute the corresponding print job.

In step S304 and step S305, the job control part 144 obtains the printer job information of the specified job ID from the job information storage part 142.

Here, the job information is obtained from the job information storage part 142 for the accuracy of the job information. The job information is also stored in the screen information storage part 152. However, this job information is stored for display purposes. Accordingly, in actual execution of the job, the printer job information is obtained from the job information storage part 142.

In step S306, the job control part 144 requests the engine control part 103 to execute the printer job based on the obtained printer job information.

In step S307, the engine control part 103 controls a printer engine and performs printing.

In step S308, the engine control part 103 notifies the job control part 144 of completion of printing.

Thus, it is possible to cause a printer job to be executed immediately by depressing a printer job shortcut.

FIG. 14 is a sequence diagram illustrating a job shortcut deleting process according to this embodiment. The process illustrated in FIG. 14 is performed after step S308 of FIG. 13.

In step S401 of FIG. 14, the job control part 144 notifies the job management part 141 of completion of printing.

In step S402 and step S403, the job management part 141 deletes the printer job information of the completed printer job from the job information storage part 142.

In step S404, the job management part 141 specifies the job ID, and requests the screen management part 151 to delete the printer job shortcut.

In step S405 and step S406, the screen management part 151 deletes the printer job shortcut information corresponding to the specified job ID from the screen information storage part 152.

In step S407, the screen management part 151 notifies the screen creating part 153 of the updating of the screen information.

In step S408, the screen creating part 153 specifies the user ID of the user who has logged on, and requests the screen information storage part 152 to obtain shortcuts to be displayed on the home screen.

In step S409, the screen information storage part 152 returns the updated screen information, from which the printer job shortcut of the completed printer job has been deleted, to the screen creating part 153.

In step S410, the screen creating part 153 creates a home screen that does not contain the printer job shortcut.

In step S411, in response to the updating of the home screen, the screen creating part 153 requests the display part 161 to update the home screen (that is, to display the updated home screen).

In step S412, the display part 161 displays the home screen that does not contain the printer job shortcut.

Thus, the job shortcut of an executed job is deleted. Therefore, it is possible to prevent an unnecessary increase in the number of job shortcuts.

FIG. 15 is a sequence diagram illustrating a job settings changing process according to this embodiment. The process illustrated in FIG. 15 is performed in response to the depression of the "CHANGE SETTINGS" button in the balloon 301 illustrated in FIG. 10.

In step S501, a user selects "CHANGE SETTINGS" from a printer job shortcut using the input part 162 of the operation control part 106.

In step S502, in response to a change in the settings of the depressed printer job shortcut, the input part 162 specifies the corresponding job ID, and notifies the screen controlling part 154 of the screen control part 105 of the details of the change. Here, it is assumed that the number of copies has been changed, but the change is not limited to this.

In step S503, the screen controlling part 154 specifies the job ID, and notifies the job control part 144 of the application part 104 of the changed number of copies.

In step S504 and step S505, the job control part 144 changes the number of copies of the job information corresponding to the specified job ID.

In step S506, the job control part 144 specifies the job ID, and notifies the job management part 141 of the changed number of copies.

In step S507, the job management part 141 outputs the job ID and the changed number of copies as well as a notification for a change in the settings of the printer job shortcut (a printer job shortcut settings change notification) to the screen management part 151.

In step S508 and step S509, the screen management part 151 updates the number of copies of the job information of the job shortcut information corresponding to the specified job ID in the screen information storage part 152 to the changed number of copies.

In step S510, the screen management part 151 notifies the screen creating part 153 of the updating of the screen information.

In step S511, the screen creating part 153 specifies the user ID of the user who has logged on, and requests the screen information storage part 152 to obtain shortcuts to be displayed on the home screen.

In step S512, the screen information storage part 152 returns the screen information including the updated printer job shortcut information.

In step S513, the screen creating part 153 creates a home screen containing the printer job shortcut whose information has been updated.

In step S514, in response to the updating of the home screen, the screen creating part 153 requests the display part 161 of the operation control part 106 to update the home screen (that is, to display the updated home screen).

In step S515, the display part 161 displays the home screen including the printer job shortcut whose information has been updated.

Thus, it is possible to change the settings of a job in the MFP 10, so that a user does not have to resend a request for execution of a job from the remote PC 20.

[Variations]

In the above-described embodiment, a description is given of a printer job. However, the jobs requested from the remote PC 20 are not limited to this, and may include jobs for a scan application, a FAX application, a copy application, etc. For example, in the case of a scan application, a user determines the setting values of a resolution at the time of data reading, document size, a data storage destination, etc., in the remote PC 20, and makes a request for a job. In the MFP 10, the user sets a document and depresses a job shortcut for the job so that this scan job is executed.

In the case of a FAX application, a user sets the setting values of a transmission destination number, the presence or absence of caller (sender) display, the presence or absence of a transmission date and time, etc., in the remote PC 20, and makes a request for a job. In the MFP 10, the user sets a document and depresses a job shortcut for the job so that this FAX job is executed.

Thus, it is possible for the MFP 10 to perform display control in the same manner as in the above-described embodiment in the case of a scan job, a FAX job, and a copy job as well. The difference between the printer job and other jobs is whether image data are transmitted from the remote PC 20. A display control process according to an embodiment of the present invention may be applied without image data as long as the setting values of the setting items of jobs are included in the job information.

Further, the display control program executed in the image processing apparatus of the embodiment may be provided by being recorded in computer-readable recording media such as a CD-ROM, a flexible disk (FD), a CD-R, a DVD (digital versatile disk) in the form of a file of installable or executable format.

Alternatively, the display control program executed in the image processing apparatus of the embodiment may also be provided by being stored in a computer connected to a network such as the Internet and downloaded to the image processing apparatus via the network. Further, the display control program executed in the image processing apparatus of the embodiment may also be provided or distributed via a network such as the Internet.

The display control program executed in the image processing apparatus of the embodiment may also be provided by being incorporated into a ROM or the like in advance.

The display control program executed in the image processing apparatus of the embodiment has a module configuration including the above-described parts. As an actual hardware operation, the control part 11 (processor) reads the program from, for example, the secondary storage part 13, and executes the read program. As a result, one or more of the above-described parts are loaded into the primary storage part 12 so as to be generated in the primary storage part 12.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention. Further, various embodiments may be implemented by suitably combining two or more of the elements illustrated in the above-described embodiment. For example, one or more of the elements illustrated in the above-described embodiment may be deleted.

What is claimed is:

1. An image forming apparatus, comprising:
a display;
a processor; and
a memory storing a program that, when executed by the processor, causes the image forming apparatus to
store a job transmitted from an information processing apparatus in the memory;
add information on an icon corresponding to the stored job to screen information corresponding to identification information transmitted together with the job, the screen information including information on a plurality of icons for executing functions of the image forming apparatus;
create a single screen that includes the icon corresponding to the stored job and the plurality of icons based on the screen information;
display the created single screen on the display; and
execute the job in response to the icon corresponding to the stored job being selected on the displayed single screen.

2. The image forming apparatus as claimed in claim 1, wherein the program, when executed by the processor, further causes the image forming apparatus to
authenticate a user; and
display the created single screen after the user is authenticated.

3. The image forming apparatus as claimed in claim 2, wherein the created single screen displayed on the display after the user is authenticated is a home screen of the user.

4. The image forming apparatus as claimed in claim 1, wherein an image of the icon corresponding to the stored job differs depending on which of the functions of the image forming apparatus is used for the job.

5. The image forming apparatus as claimed in claim 1, wherein the program, when executed by the processor, further causes the image forming apparatus to display information indicating a setting of the job together with the icon corresponding to the stored job on the displayed single screen.

6. The image forming apparatus as claimed in claim 5, wherein the program, when executed by the processor, further causes the image forming apparatus to display the information indicating the setting of the job as an icon badge over the icon corresponding to the stored job.

7. The image forming apparatus as claimed in claim 5, wherein the program, when executed by the processor, further causes the image forming apparatus to
receive a change in a setting of the job after the icon corresponding to the stored job is selected on the displayed single screen; and
execute the job having the setting changed after receiving the change in the setting of the job.

8. The image forming apparatus as claimed in claim 1, wherein the program, when executed by the processor, causes the image forming apparatus to create the single screen in response to the identification information being input to the image forming apparatus.

9. A display control method executed by an image forming apparatus, the image forming apparatus including a display, a processor, and a memory storing a program that, when executed by the processor, causes the image forming apparatus to execute the display control method, the display control method comprising:
storing a job transmitted from an information processing apparatus in the memory;
adding information on an icon corresponding to the stored job to screen information corresponding to identification information transmitted together with the job, the screen information including information on a plurality of icons for executing functions of the image forming apparatus;
creating a single screen that includes the icon corresponding to the stored job and the plurality of icons based on the screen information;
displaying the created single screen on the display; and
executing the job in response to the icon corresponding to the stored job being selected on the displayed single screen.

10. The display control method as claimed in claim 9, wherein the single screen is created in response to the identification information being input to the image forming apparatus.

11. A non-transitory, computer-readable recording medium storing a program that, when executed by a processor of an image forming apparatus, causes the image forming apparatus to:
store a job transmitted from an information processing apparatus in a memory of the image forming apparatus;
add information on an icon corresponding to the stored job to screen information corresponding to identification information transmitted together with the job, the screen information including information on a plurality of icons for executing functions of the image forming apparatus;

create a single screen that includes the icon corresponding to the stored job and the plurality of icons based on the screen information;

display the created single screen on a display of the image forming apparatus; and execute the job in response to the icon corresponding to the stored job being selected on the displayed single screen.

12. The non-transitory, computer-readable recording medium as claimed in claim 11, wherein the program, when executed by the processor of the image forming apparatus, causes the image forming apparatus to create the single screen in response to the identification information being input to the image forming apparatus.

* * * * *